United States Patent
Svihla et al.

(10) Patent No.: US 9,835,164 B2
(45) Date of Patent: Dec. 5, 2017

(54) COMPRESSOR IMPELLER ASSEMBLY FOR A TURBOCHARGER

(71) Applicant: Electro-Motive Diesel, Inc., LaGrange, IL (US)

(72) Inventors: Gary R. Svihla, Burr Ridge, IL (US); Raji Rexavier, Plainfield, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 510 days.

(21) Appl. No.: 14/506,132

(22) Filed: Oct. 3, 2014

(65) Prior Publication Data

US 2016/0097283 A1 Apr. 7, 2016

(51) Int. Cl.
| | | |
|---|---|---|
| *F04D 29/26* | (2006.01) | |
| *F04D 17/10* | (2006.01) | |
| *F02C 6/12* | (2006.01) | |

(52) U.S. Cl.
CPC .............. *F04D 29/266* (2013.01); *F02C 6/12* (2013.01); *F04D 17/10* (2013.01); *F05D 2220/40* (2013.01)

(58) Field of Classification Search
CPC ........ F04D 29/266; F04D 17/10; F01D 5/025; F02C 6/12; F05D 2220/40; F05B 2220/40
See application file for complete search history.

(56) References Cited

U.S. PATENT DOCUMENTS

| | | |
|---|---|---|
| 3,104,459 A | 9/1963 | Wendt |
| 6,896,479 B2 | 5/2005 | Svihla et al. |
| 6,948,913 B2 | 9/2005 | Heyes et al. |
| 7,182,579 B2 | 2/2007 | Roso et al. |
| 2015/0093247 A1* | 4/2015 | Asano ............... F04D 29/266 416/204 R |

FOREIGN PATENT DOCUMENTS

| | | | |
|---|---|---|---|
| DE | 102008056058 A1 * | 2/2010 | ............ F01D 5/026 |
| WO | WO 2013/110922 A1 | 8/2013 | |
| WO | WO 2014/060274 A1 | 4/2014 | |
| WO | WO 2014/083325 A1 | 6/2014 | |
| WO | WO 2014083325 A1 * | 6/2014 | ............ F01D 5/025 |

* cited by examiner

*Primary Examiner* — Ninh H Nguyen
*Assistant Examiner* — Brian P Wolcott
(74) *Attorney, Agent, or Firm* — Finnegan, Henderson, Farabow, Garrett & Dunner, LLP

(57) ABSTRACT

A compressor impeller assembly is disclosed. The compressor impeller assembly may have a compressor impeller having an impeller bore. The compressor impeller assembly may further have an insert screwed into the impeller bore, the insert having a threaded insert bore. The compressor impeller assembly may also have a shaft having a threaded shaft bore. In addition, the compressor impeller assembly may have a stud. The stud may have a first threaded portion engaged with the threaded insert bore. The stud may also have a second threaded portion engaged with the threaded shaft bore.

15 Claims, 5 Drawing Sheets

COMPRESSOR IMPELLER ASSEMBLY FOR A TURBOCHARGER

TECHNICAL FIELD

The present disclosure relates generally to a compressor impeller assembly and, more particularly, to a compressor impeller assembly for a turbocharger.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into the combustion chambers of the engine. The increased supply of air allows for increased fuel combustion in the combustion chambers of the engine, resulting in increased power output from the engine.

A typical turbocharger includes a shaft, a turbine wheel attached to one end of the shaft, a compressor impeller connected to the other end of the shaft, and bearings to support the shaft. The compressor impeller is often mounted to the shaft using a nut that engages threads on the shaft near a nose portion of the compressor impeller. The nut is tightened to push the compressor impeller onto the shaft and applies a clamp load on the compressor impeller. Some turbochargers employ a boreless impeller. In these turbochargers, the compressor impeller has a threaded portion and the compressor impeller is used as a nut, which engages the threads on the shaft. Such an assembly requires specialized tools to assemble the compressor impeller onto the shaft without damaging the blades on the compressor impeller.

Hot exhaust from the engine flows through the turbine housing and expands over the turbine wheel, rotating the turbine wheel and the shaft connected to the turbine wheel. The shaft in turn rotates the compressor impeller. As the temperature of the shaft increases because of heat transferred to the shaft from the hot exhaust, the shaft expands both diametrically and axially. In a typical embodiment where the shaft extends along the length of the compressor impeller, several factors can influence the clamp load on the compressor impeller. When the shaft increases in temperature beyond the surrounding oil temperature, the resultant increase in length also reduces the clamp load on the nose of the compressor impeller. Further during typical turbocharger operations the compressor impeller varies in length relative to the clamped portion of the shaft due to centrifugal load acting radially, because of the temperature variation due to variations in the intake air temperature variation, and because of compression of the air. Increased rotational speed shortens the impeller as does cold inlet air temperature. Heating due to compression of the intake air counteracts the reduction in the length of the compressor impeller. These changes in length affect the compressive force on the nose of the compressor impeller and therefore the mounting joint fixity at the mounting end opposite the contact area at the nose of the impeller. The other potential for distortion from the axis of rotation occurs at the nose interface. If the applied clamp load strays from the geometric center of the compressor impeller due to insufficient piloting of the shaft or if the reaction surface does not remain square to the central axis, a lateral component of the shaft, the clamp load can distort the impeller enough to impact balance of the rotor. This in turn may cause the impeller blades to contact the housing walls, causing damage to the impeller blades and/or to the housing walls.

U.S. Pat. No. 6,896,479 of Svihla et al. issued on May 24, 2005 ("the '479 patent") discloses an impeller assembly that aims to simplify manufacturing and assembly. In particular, the '479 patent discloses a turbocharger rotor that has a turbine wheel and shaft, a compressor wheel and adapter and a separate thrust runner clamped together by a fastener rod. The '479 patent discloses that the adapter is piloted onto the shaft and the thrust runner is piloted on the adapter. The '479 patent also discloses that an anti-rotation coupling relates the phase angles of the shaft with the adapter and the thrust runner during assembly. In addition, the '479 patent discloses that a fastener rod extends through axial openings in the compressor wheel, the adapter, and the drive shaft and includes a threaded end, which engages with the turbine wheel. The '479 patent also discloses that a nut engaging with threads on the fastener rod clamps the compressor wheel, adapter, thrust runner, and drive shaft together.

Although the compressor wheel assembly disclosed in the '479 patent attempts to provide simplification of manufacture and assembly, the disclosed compressor wheel assembly may still be less than optimal. In particular, thermal expansion of the fastener rod and impeller during operation of the turbocharger of the '479 patent may contribute to variation in clamp load, which may impact overall rotor stability. The clamp load variation may cause the drive shaft and compressor wheel to rotate off center from an axis of rotation of the compressor wheel assembly. Additionally, in the event of catastrophic failure of the compressor wheel due to excessive speed or material fatigue, the aerodynamic load acting on the turbine wheel may propel the drive shaft, fastener rod, and the turbine wheel attached to the fastener rod out of the bearing housing.

The compressor impeller assembly of the present disclosure solves one or more of the problems set forth above and/or other problems of the prior art.

SUMMARY

In one aspect, the present disclosure is directed to a compressor impeller assembly. The compressor impeller assembly may include a compressor impeller having an impeller bore. The compressor impeller assembly may further include an insert screwed into the impeller bore. The insert may include a threaded insert bore. The compressor impeller assembly may include a shaft including a threaded shaft bore. In addition, the compressor impeller assembly may include a stud. The stud may include a first threaded portion engaged with the threaded insert bore. The stud may also include a second threaded portion engaged with the threaded shaft bore.

In another aspect, the present disclosure is directed to another compressor impeller assembly. The compressor impeller assembly may include a compressor impeller including a front end and a rear end opposite the front end. The compressor impeller may include a nose disposed adjacent the front end. The compressor impeller may further include a hub extension disposed adjacent the rear end. The hub extension may include an impeller bore and a first outer surface. The compressor impeller may also include blades disposed between the nose and the hub extension. The compressor impeller assembly may include an insert screwed into the impeller bore. The compressor impeller assembly may also include a shaft extending from a first shaft end to a second shaft end. The shaft may be attached to the insert adjacent the first shaft end.

DETAILED DESCRIPTION

Figure 1:
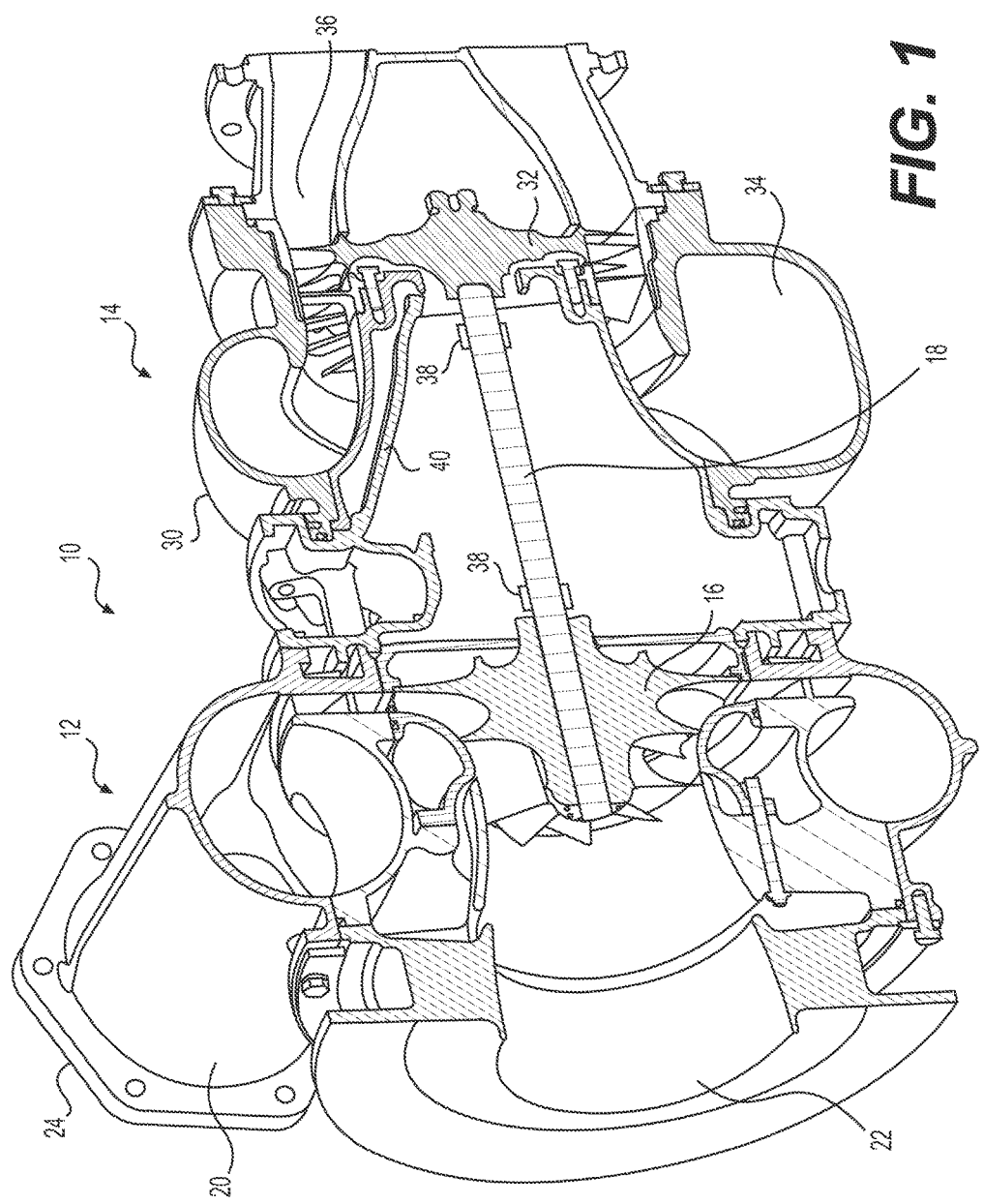
FIG. 1 is a cut-away view of an exemplary disclosed turbocharger.

FIG. 1 illustrates an exemplary embodiment of a turbocharger 10. Turbocharger 10 may be used with an engine (not shown) of a machine that performs some type of operation associated with an industry such as railroad, marine, power generation, mining, construction, farming, or another industry known in the art. As shown in FIG. 1, turbocharger 10 may include compressor stage 12 and turbine stage 14. Compressor stage 12 may embody a fixed geometry compressor impeller 16 attached to shaft 18 configured to compress air received from an ambient to a predetermined pressure level before the air enters the engine for combustion. Air may enter compressor housing 20 via compressor inlet 22 and exit compressor housing 20 via compressor outlet 24. As air moves through compressor stage 12, compressor impeller 16 may force compressed air into the engine.

Turbine stage 14 may include turbine housing 30 and turbine wheel 32, which may be attached to shaft 18. Exhaust gases exiting the engine may enter turbine housing 30 via turbine inlet 34 and exit turbine housing 30 via turbine outlet 36. As the hot exhaust gases move through turbine housing 30 and expand against the blades of turbine wheel 32, turbine wheel 32 may rotate compressor impeller 16 via shaft 18. Bearings 38 may support shaft 18. Bearings 38 may be disposed in bearing housing 40. Although FIG. 1 illustrates only two bearings 38, it is contemplated that turbocharger 10 may include any number of bearings 38.

Figure 2:
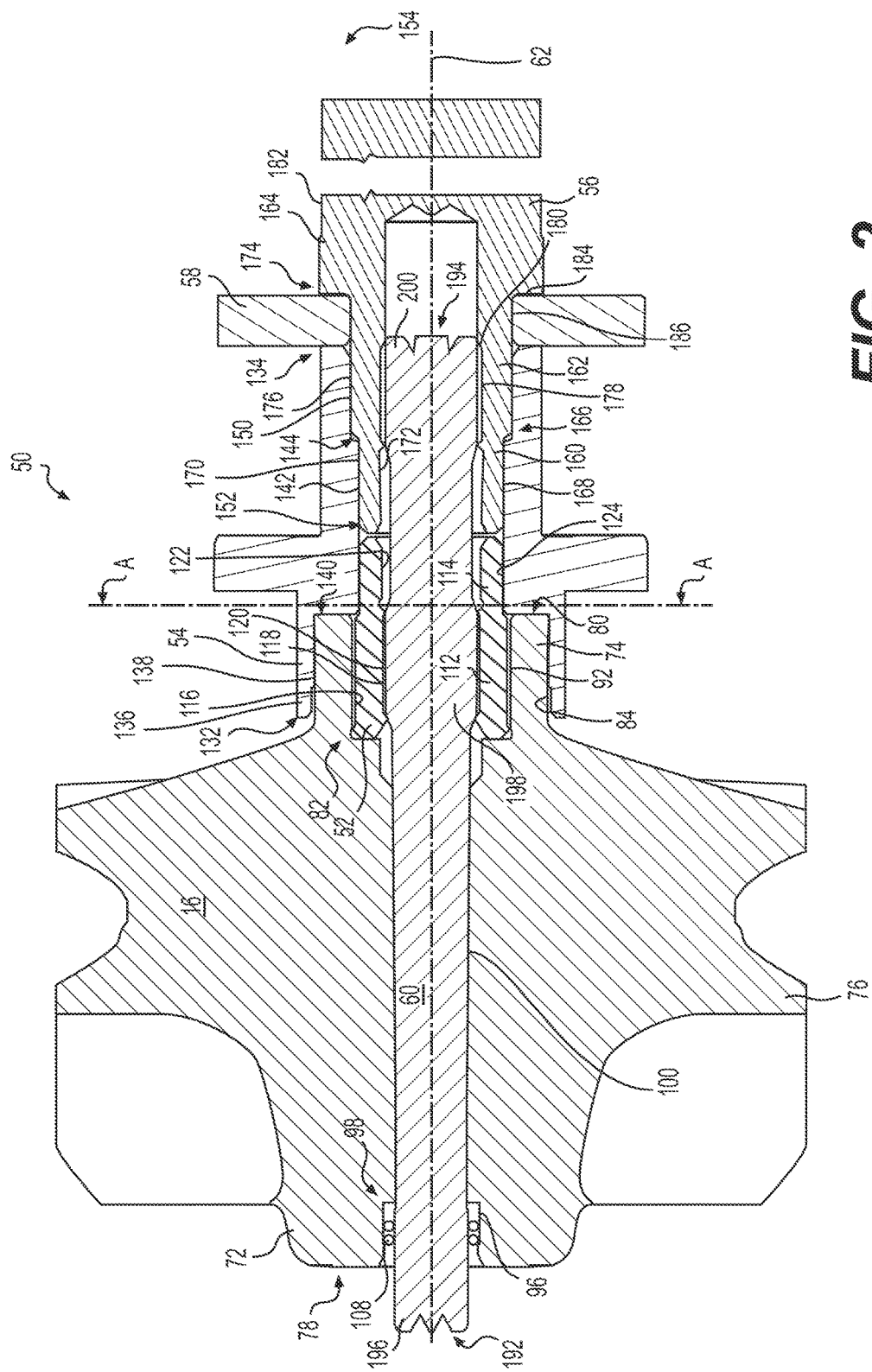
FIG. 2 is a cut-away view of an exemplary disclosed embodiment of a compressor impeller assembly for the turbocharger of FIG. 1.

FIG. 2 illustrates an exemplary embodiment of a compressor impeller assembly 50. Compressor impeller assembly 50 may include compressor impeller 16, insert 52, impeller cap 54, shaft 56, thrust washer 58, and stud 60, all of which may be disposed around a rotational axis 62. Compressor impeller 16 may include a nose 72, a hub extension 74, and blades 76. Nose 72 may be disposed adjacent front end 78 of compressor impeller 16. Hub extension 74 may be disposed adjacent rear end 80 of compressor impeller 16. Rear end 80 may be disposed opposite front end 78. Blades 76 may be disposed between nose 72 and hub extension 74. Compressor impeller 16 may be made of metal. In one exemplary embodiment, compressor impeller 16 may be made of aluminum or an aluminum alloy material.

Hub extension 74 may extend from rear end 80 of compressor impeller 16 to first distal end 82 disposed between front end 78 and rear end 80. Hub extension 74 may have a diameter smaller than an outer diameter of blades 76. Hub extension 74 may have a generally cylindrically shaped outer surface 84. It is contemplated, however, that outer surface 84 may have an elliptical, polygonal, or any other shape known in the art. Compressor impeller 16 may have a first impeller bore 92, which may be disposed within hub extension 74 adjacent rear end 80. First impeller bore 92 may extend from rear end 80 to adjacent first distal end 82. First impeller bore 92 may have a first diameter. First impeller bore 92 may also be threaded. Compressor impeller 16 may have a second impeller bore 96, which may be disposed within nose 72 adjacent front end 78. Second impeller bore 96 may extend from front end 78 to second distal end 98 disposed between front end 78 and first distal end 82. Second impeller bore 96 may have a second diameter. Compressor impeller 16 may also have a third impeller bore 100 disposed between front end 78 and rear end 80. Third impeller bore 100 may extend from adjacent first distal end 82 to adjacent second distal end 98. Third impeller bore 100 may have a third diameter, which may be smaller than first and second diameters of first and second impeller bores 92, 96, respectively.

Figure 3:
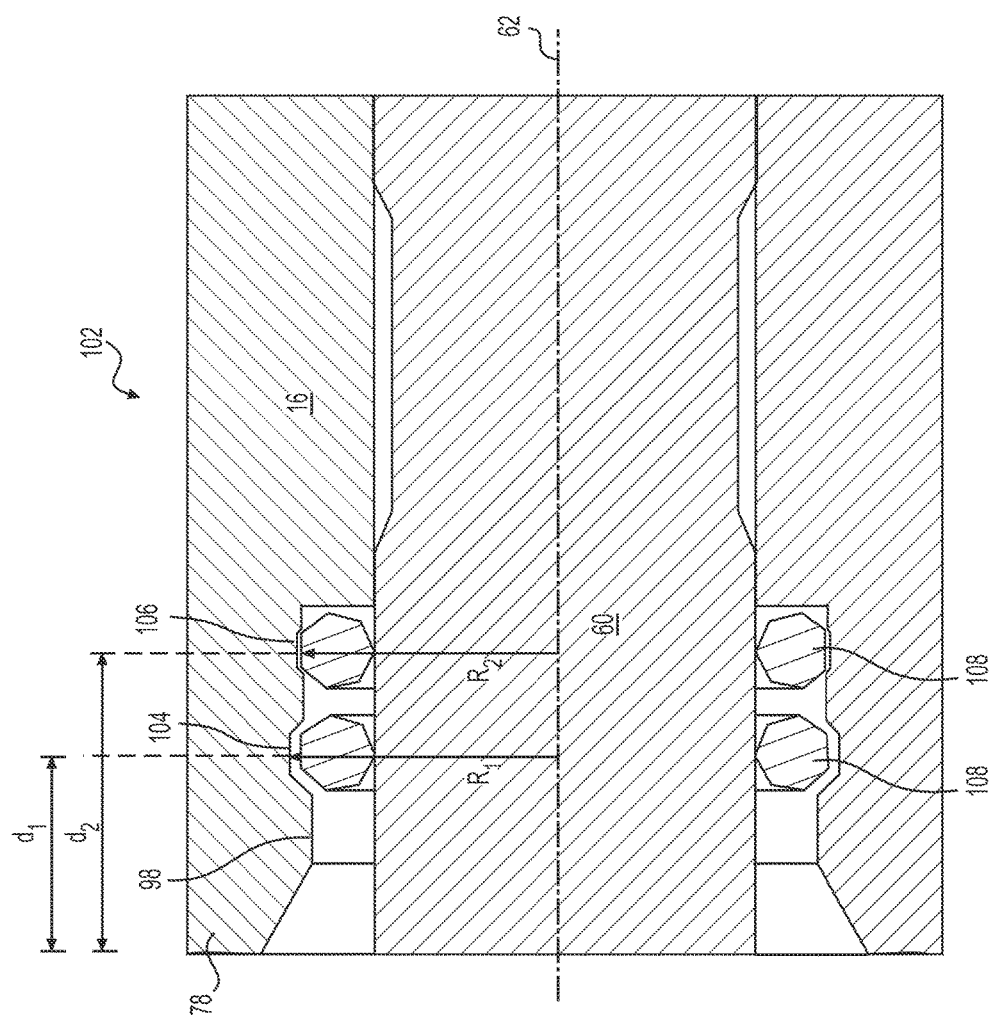
FIG. 3 is another cut-away view showing an exemplary disclosed sealing arrangement of the compressor impeller assembly of FIG. 2.

As illustrated in FIG. 3, compressor impeller 16 may include a sealing arrangement 102 disposed within nose 72. Sealing arrangement 102 may include a first annular recess 104 disposed at a first axial distance "d1" from front end 78. Sealing arrangement 102 may also include a second annular recess 106 disposed at a second axial distance "d2" from front end 78. In one exemplary embodiment as illustrated in FIG. 3, second distance d2 may be larger than first axial distance d1. First annular recess 104 may have a first radius "R1" and second annular recess 106 may have a second radius "R2." In one exemplary embodiment, first radius R1 may be larger than second radius R2. Sealing arrangement 102 may also include seal members 108 disposed in first and second annular recesses 104, 106. Seal members 108 may have a cross-section, which may have a circular or any other uniform shape known in the art. In one exemplary embodiment, seal members 108 may be O-rings. In the exemplary embodiment as illustrated in FIG. 3, in which radius R2 may be smaller than radius R1, seal member 108 in second annular recess 106 may be compressed to a greater extent compared to seal member 108 in first annular recess 104. Thus, seal member 108 in second annular recess 106 may provide a stronger seal compared to seal member 108 in first annular recess 104. Sealing arrangement 102 may help to prevent moisture and contaminants from entering into compressor impeller assembly 50 via first, second, and third impeller bores 92, 96, 100.

Returning to FIG. 2, insert 52 may have a first insert portion 112 that may be disposed within first impeller bore 92 and a second insert portion 114 that may be disposed outside first impeller bore 92. First insert portion 112 may have an outer surface 116 that may be threaded. Threads on outer surface 116 of first insert portion 112 may engage with threads in first impeller bore 92 to help screw insert 52 into first impeller bore 92. First insert portion 112 may also include a first insert bore 118 that may be threaded. Threads 120 in first insert bore 118 may have a first pitch. Second insert portion 114 may have a second insert bore 122, which may have a diameter equal to or different from that of first insert bore 118. Second insert portion 114 may also have an outer surface 124.

Impeller cap 54 may extend from a first cap end 132 to a second cap end 134. In one exemplary embodiment as illustrated in FIG. 2, first cap end 132 may be disposed adjacent first distal end 82 of first impeller bore 92. Impeller cap 54 may have a cap portion 136 disposed adjacent first cap end 132. Impeller cap 54 may also have a first cap bore 138 disposed within cap portion 136 and adjacent first cap end 132. First cap bore 138 may extend from first cap end 132 to third distal end 140 disposed between first cap end 132 and second cap end 134. First cap bore 138 may have a diameter such that cap portion 136 may be disposed around outer surface 84 of hub extension 74. In one exemplary embodiment, cap portion 136 may engage with outer surface 84 via an interference fit. In another exemplary embodiment, cap portion 136 may engage with outer surface 84 via a clearance fit. Impeller cap 54 may include a second cap bore 142, which may be disposed between first cap end 132 and second cap end 134. Second cap bore 142 may extend from third distal end 140 to fourth distal end 144 disposed between third distal end 140 and second cap end 134. Second cap bore 142 may engage with outer surface 124 of insert 52.

Figure 4:
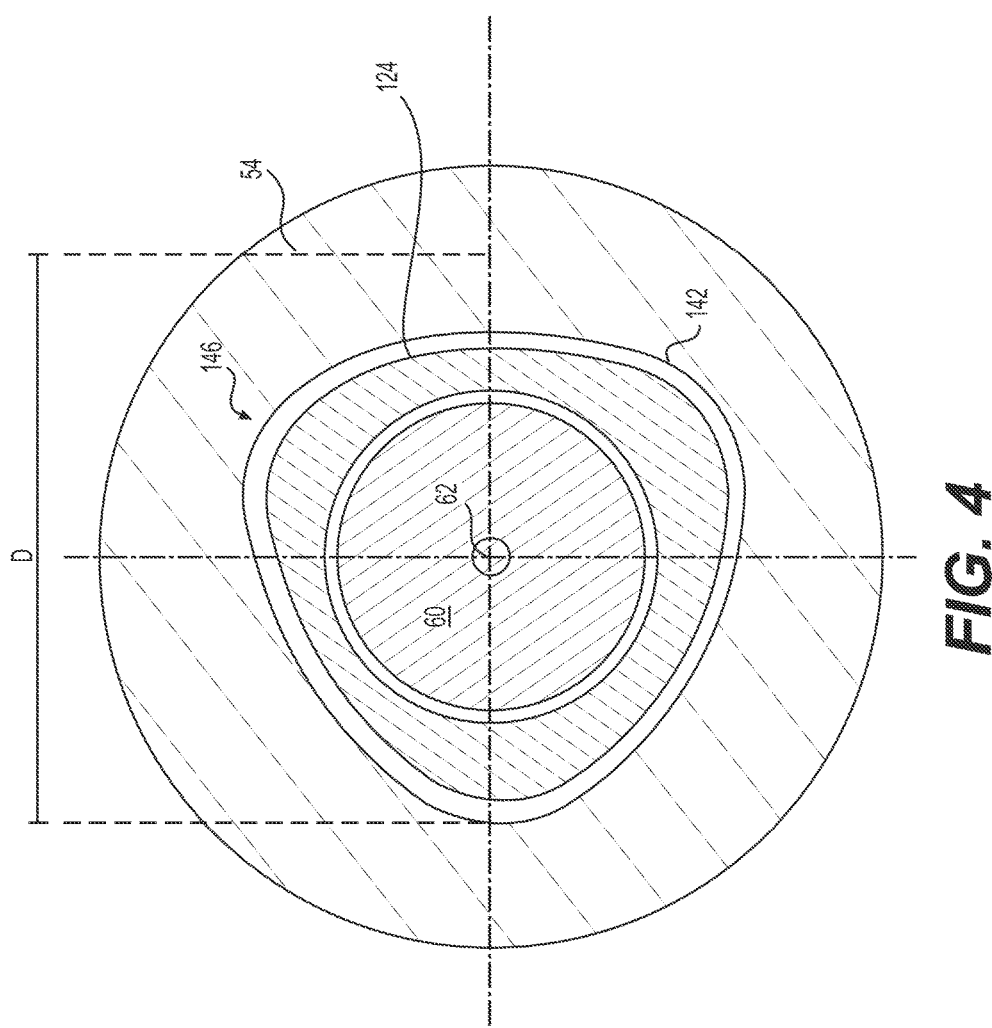
FIG. 4 is a diagrammatic section view of an exemplary disclosed anti-rotation feature of the compressor impeller assembly of FIG. 2.

FIG. 4 illustrates a cross-sectional view along A-A of FIG. 2 showing anti-rotational feature 146 formed between second cap bore 142 and outer surface 124 of second insert portion 114 (see FIG. 2). As illustrated in FIG. 4, outer surface 124 of second insert portion 114 of insert 52 may have a three-lobed polygonal shape. Second cap bore 142 may also have a three-lobed polygonal shape corresponding to the shape of outer surface 124. As illustrated in FIG. 4, dimensions of the three-lobed polygon in second cap bore 142 may be selected such that second cap bore 142 engages with the three-lobed polygon on outer surface 124 via a clearance fit. It is contemplated, however, that second cap bore 142 and outer surface 124 may be engaged via an interference fit. Although a three-lobed polygonal shape has been described with respect to outer surface 124 and second cap bore 142, it is contemplated that outer surface 124 and second cap bore 142 may have any other type of polygonal shape known in the art. Anti-rotational feature 146 may help prevent relative rotational motion between insert 52 and impeller cap 54. Anti-rotational feature 146 may also help to center stud 60 and help to maintain the two components concentric with each other. Returning to FIG. 2, impeller cap 54 may also have third cap bore 150 disposed between first cap end 132 and second cap end 134. Third cap bore 150 may extend from second cap end 134 to fourth distal end 144. Third cap bore 150 may have a diameter "D" larger than or equal to an outer diameter of the anti-rotational feature 146 in second cap bore 142. Thus, for example, third cap bore 150 may have a diameter, which may circumscribe the three-lobed polygon shape of second cap bore 142.

Shaft 56 may extend from a first shaft end 152 to a second shaft end 154. Turbine wheel 32 (see FIG. 1) may be attached to second shaft end 154. Shaft 56 may include a leading shaft portion 160, a shaft pilot 162, and a trailing shaft portion 164. Leading shaft portion 160 may be disposed adjacent first shaft end 152. Leading shaft portion 160 may extend from first shaft end 152 to fifth distal end 166 disposed between first shaft end 152 and second shaft end 154. In one exemplary embodiment as illustrated in FIG. 2, fifth distal end 166 may be disposed adjacent fourth distal end 144 of impeller cap 54. Leading shaft portion 160 may have an outer surface 168 which may engage with second cap bore 142. Outer surface 168 and second cap bore 142 may include anti-rotational feature 170, which may have a similar structure and function as anti-rotational feature 146. Leading shaft portion 160 may also have a first shaft bore 172.

Shaft pilot 162 may be disposed between first shaft end 152 and second shaft end 154. Shaft pilot 162 may extend from fifth distal end 166 to sixth distal end 174 disposed between fifth distal end 166 and second shaft end 154. Shaft pilot 162 may include an outer surface 176, which may have a generally cylindrical shape having a diameter equal to or greater than a diameter of outer surface 168 of leading shaft portion 160. It is contemplated, however, that outer surface 176 may have an elliptical, polygonal or any other shape known in the art. Shaft pilot 162 may engage with third cap bore 150 via a clearance fit or an interference fit. Shaft pilot 162 may also include a second shaft bore 178. Some or all portions of second shaft bore 178 may be threaded. Threads 180 in second shaft bore 178 may have a second pitch which may be different from the first pitch of threads 120 in first insert bore 118. In one exemplary embodiment, second pitch of threads 180 may be coarser than first pitch of threads 120.

Trailing shaft portion 164 may be disposed adjacent second shaft end 154. Trailing shaft portion 164 may have a generally cylindrical outer surface 182. In one exemplary embodiment as illustrated in FIG. 2, outer surface 182 may have a diameter larger than a diameter of outer surface 176 of shaft pilot 162, creating a shoulder 184 on shaft 56. Shoulder 184 may be disposed between first shaft end 152 and second shaft end 154. In one exemplary embodiment as illustrated in FIG. 2, shoulder 184 may be disposed adjacent sixth distal end 174. Thrust washer 58 may be disposed adjacent second cap end 134. Thrust washer 58 may have a washer bore 186, which may engage with outer surface 176 of shaft pilot 162. In one exemplary embodiment, washer bore 186 may engage with outer surface 176 via an interference fit. In another exemplary embodiment, washer bore 186 may engage with outer surface 176 via a clearance fit. Thrust washer 58 may be disposed between second cap end 134 of impeller cap 54 and shoulder 184 of shaft 56.

Stud 60 may extend from a first stud end 192 disposed adjacent front end 78 of compressor impeller 16 to a second stud end 194 disposed adjacent sixth distal end 174 of shaft 56. As illustrated in FIG. 2, stud 60 may pass through first and second impeller bores 92, 96, first and second insert bores 118, 122, and first and second shaft bores 172, 178. Stud 60 may include a drive portion 196 disposed adjacent front end 78 of compressor impeller 16. Drive portion 196 may have a polygonal shape to help ensure that stud 60 can be turned using a tool, for example, a wrench. In one exemplary embodiment, drive portion 196 may have a hexagonal shape.

Stud 60 may include a first threaded portion 198 and a second threaded portion 200. First threaded portion 198 may be disposed between first stud end 192 and second stud end 194. First threaded portion 198 may have threads having a pitch equal to the first pitch and may engage with threads 120 in first insert bore 118. Second threaded portion 200 of stud 60 may be disposed adjacent second stud end 194. Second threaded portion 200 may have threads having a pitch equal to the second pitch and may engage with threads 180 of second shaft bore 178. Shaft 56 and stud 60 may correspond to shaft 18 illustrated in FIG. 1.

Figure 5:
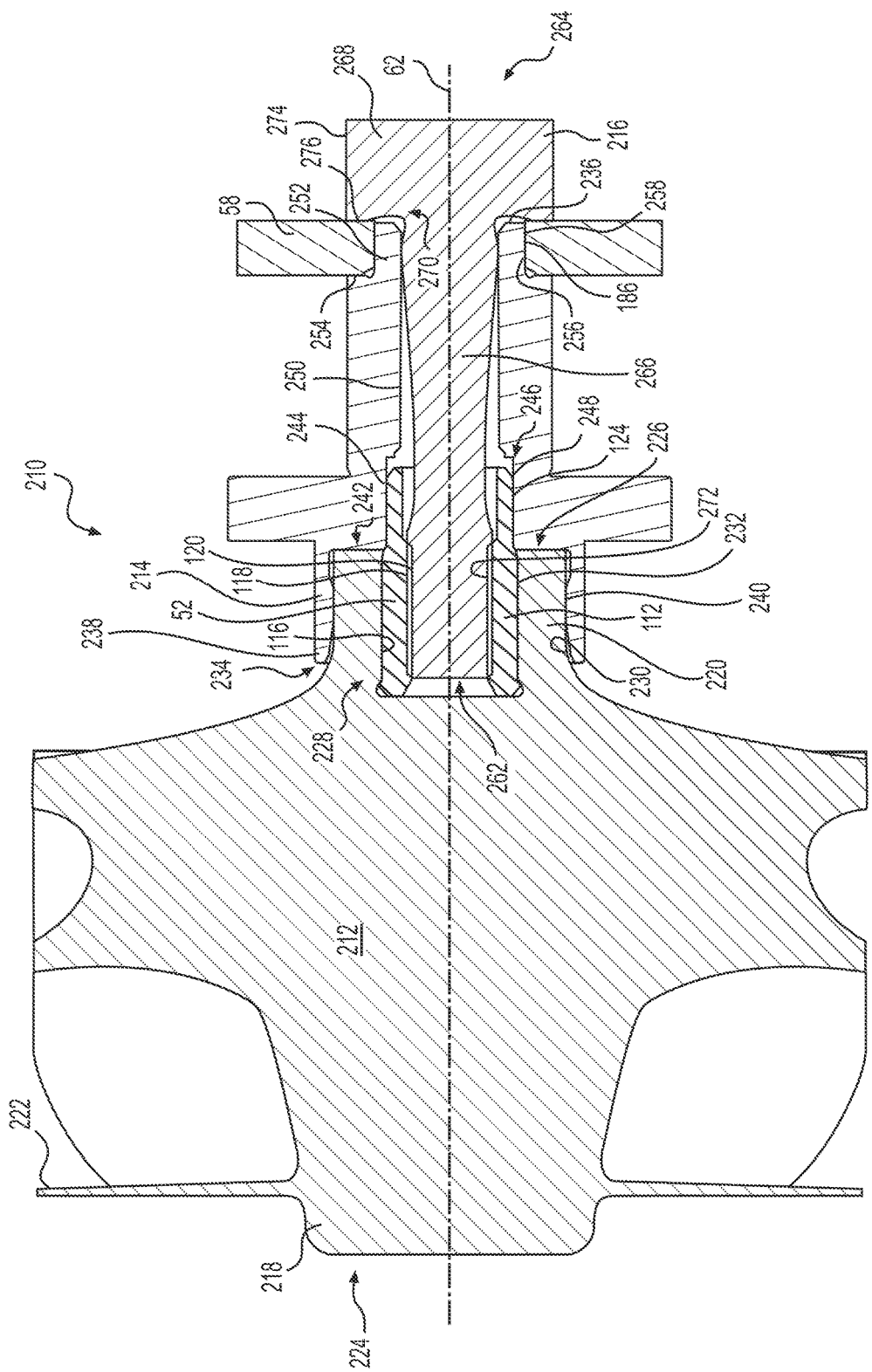
FIG. 5 is a cut-away view of another exemplary disclosed embodiment of a compressor impeller assembly for the turbocharger of FIG. 1.

FIG. 5 illustrates an exemplary embodiment of another compressor impeller assembly 210. Some of the components of compressor impeller assembly 210, for example insert 52 and thrust washer 58, are similar to the components of compressor impeller assembly 50. Only components, which may have a different structure and/or function in compressor impeller assembly 210 are described in detail in the following description. Compressor impeller assembly 210 may include compressor impeller 212, insert 52, impeller cap 214, thrust washer 58, and shaft 216. Compressor impeller 212 may perform functions similar to compressor impeller 16 when included in turbocharger 10. Compressor impeller 212 may include a nose 218, a hub extension 220, and blades 222. Nose 218 may be disposed adjacent front end 224 of compressor impeller 212. Hub extension 220 may be disposed adjacent rear end 226 of compressor impeller 212. Rear end 226 may be disposed opposite front end 224. Blades 222 may be disposed between nose 218 and hub extension 220. Compressor impeller 212 may be made of metal. In one exemplary embodiment, compressor impeller 212 may be made of aluminum or an aluminum alloy material.

Hub extension 220 may be disposed adjacent rear end 226 of compressor impeller 212. Hub extension 220 may extend from rear end 226 to first distal end 228 disposed between front end 224 and rear end 226. Hub extension 220 may have a diameter smaller than an outer diameter of blades 222. Hub extension 220 may have a generally cylindrically shaped outer surface 230. It is contemplated, however, that outer surface 230 may have an elliptical, polygonal, or any other shape known in the art.

Compressor impeller 212 may have an impeller bore 232 disposed in hub extension 220 adjacent rear end 226. Impeller bore 232 may extend from rear end 226 to adjacent first distal end 228 disposed between front end 224 and rear end 226. Impeller bore 232 may have a first diameter. Impeller bore 232 may also be threaded. Outer surface 116 of first insert portion 112 of insert 52 may engage with threads in impeller bore 232 to help attach insert 52 to compressor impeller 212.

Impeller cap 214 may extend from a first cap end 234 to a second cap end 236. In one exemplary embodiment as illustrated in FIG. 5, first cap end 234 may be disposed adjacent first distal end 228 of impeller bore 232. Impeller cap 214 may have a cap portion 238 disposed adjacent first cap end 234. Cap portion 238 may have a first cap bore 240 which may extend from first cap end 234 to second distal end 242 disposed between first cap end 234 and second cap end 236. First cap bore 240 may have a diameter such that cap portion 238 may be disposed around outer surface 230 of hub extension 220. In one exemplary embodiment, cap portion 238 may engage with outer surface 230 via an interference fit. In another exemplary embodiment, cap portion 238 may engage outer surface 230 with a clearance fit. Impeller cap 214 may include a second cap bore 244 disposed between first cap end 234 and second cap end 236. Second cap bore 244 may extend from second distal end 242 to third distal end 246 disposed between second distal end 242 and second cap end 236. Second cap bore 142 may engage with outer surface 124 of insert 52. Second cap bore 142 and outer surface 124 may include anti-rotational feature 248, which may have a structure and function similar to that of anti-rotational feature 146. Impeller cap 214 may also have third cap bore 250 disposed between first cap end 234 and second cap end 236. Third cap bore 250 may extend from second cap end 236 to third distal end 246. Third cap bore 250 may have a diameter equal to or different from a diameter of second cap bore 244.

Impeller cap 214 may include a cap pilot 252 disposed adjacent second cap end 236. Cap pilot 252 may extend from second cap end 236 to shoulder 254 disposed between third distal end 246 and second cap end 236. Cap pilot 252 may have an outer surface 256 which may engage with washer bore 186 of thrust washer 58. Outer surface 256 and washer bore 186 may include an anti-rotational feature 258, which may have a structure and function similar to that of anti-rotational feature 146.

Shaft 216 may extend from a first shaft end 262 to a second shaft end 264. Turbine wheel 32 (see FIG. 1) may be attached to second shaft end 264. Shaft 216 may include a first shaft portion 266 and a second shaft portion 268. First shaft portion 266 may extend from first shaft end 262 to fourth distal end 270 disposed between first shaft end 262 and second shaft end 264. In one exemplary embodiment as illustrated in FIG. 5, fourth distal end 270 may be disposed adjacent second cap end 236. First shaft portion 266 may have a threaded region 272. In one exemplary embodiment as illustrated in FIG. 5, threaded region 272 may extend over a length smaller than a length of first shaft portion 266. Threaded region 272 of first shaft portion 266 may engage with threads 120 in first insert bore 118 of insert 52.

Second shaft portion 268 may have a generally cylindrical outer surface 274. In one exemplary embodiment as illustrated in FIG. 2, outer surface 274 may have a diameter larger than a diameter of threaded region 272 of first shaft portion 266, creating a shoulder 276 on shaft 216. Shoulder 276 may be disposed between first shaft end 262 and second shaft end 264. In one exemplary embodiment as illustrated in FIG. 5, shoulder 276 may be disposed adjacent second cap end 236. Thrust washer 58 may be disposed between shoulder 254 of impeller cap 214 and shoulder 276 of shaft 216. Shaft 216 may correspond to shaft 18 illustrated in FIG. 1.

INDUSTRIAL APPLICABILITY

The disclosed compressor impeller assemblies may be implemented to attach a compressor impeller to a shaft of a turbocharger associated with an internal combustion engine. The disclosed compressor impeller assemblies 50, 210 may offer an improved compressor impeller 16, 212 attachment to a shaft 18 of a turbocharger 10 by allowing compressor impeller 16, 212 to be pulled or drawn into the compressor impeller assemblies 50, 210 during assembly. As a result, shaft pilot 162 and stud 60 may be subjected to a tensile pre-load in compressor impeller assembly 50. Similarly first shaft portion 266 may be subjected to a tensile pre-load in compressor impeller assembly 210. Notably, a minimal amount of extension of a length of shaft pilot 162 or first shaft portion 266 in compressor impeller assemblies 50, 210 may be required to generate the tensile load. As a result, thermal growth of compressor impeller 16 and variation in length of compressor impeller 16 due to mechanical loading do not significantly affect the clamp load generated in compressor impeller assemblies 50, 210 helping to ensure that compressor impeller assemblies 50, 210 are minimally affected by temperature changes. Further, applying a tensile pre-load with first shaft portion 266 and stud 60 to hub extension 74 through insert 52 may also help the disclosed compressor impeller assemblies 50 and 210 minimize generation of transverse loads on shafts 56, 216. Thus, compressor impeller assemblies 50 and 210 may help maintain concentricity of compressor impeller 16 and 212 with shafts 56 and 216, respectively during operation of turbocharger 10, minimizing the risk of compressor impellers 16, 212 contacting compressor housing 20. Additionally, in the event of a catastrophic failure in which compressor impellers 16, 212 may burst due to an over-speed condition or from material fatigue, mechanical energy may be released due to joint failure and due to the aerodynamic load on turbine wheel 32. The released mechanical energy may tend to propel shaft 56 and stud 60 in compressor impeller assembly 50 and shaft 216 in compressor impeller assembly 210 outward from turbocharger 10, which may cause further damage to turbocharger 10. Insert 52 may remain attached to both stud 60 and first shaft portion 266 in the event of a failure of compressor impellers 16, 212 through a combination of threads 120 form and anti-rotational features 146, 248 and may help to lock impeller caps 54, 214 to shafts 56, 216, respectively and constrain shafts 56, 216 to remain within bearing housing 40, helping to prevent ejection of shafts 56, 216 or stud 60 out of turbocharger 10.

Referring to FIGS. 2, 3, and 4, during assembly of turbocharger 10 using compressor impeller assembly 50, insert 52 may be attached to compressor impeller 16 by screwing first insert portion 112 into first impeller bore 92. Impeller cap 54 may be attached to compressor impeller 16 so that cap portion 136 of impeller cap 54 may engage with outer surface 84 of hub extension 74, while simultaneously allowing outer surface 124 of insert 52 to engage via anti-rotational feature 146 with second cap bore 142. Thrust washer 58 may be mounted on shaft pilot 162 via an interference fit or a clearance fit between washer bore 186 and outer surface 168 of shaft pilot 162. Compressor impeller 16 with insert 52 and impeller cap 54 may be attached to leading shaft portion 160 so that outer surface 168 of leading shaft portion 160 may engage with second cap bore 142 via anti-rotational feature 170.

Stud 60 may pass through first and second impeller bores 92, 96, first and second insert bores 118, 122, and first and second shaft bores 172, 178. Drive portion 196 of stud 60 may be rotated using a wrench or some other tool. As drive portion 196 is rotated, first threaded portion 198 of stud 60 may engage with threads 120 in first insert bore 118 and second threaded portion 200 of stud 60 may engage with threads 180 in second shaft bore 178. Rotation of drive portion 196 may help to draw compressor impeller 16 and thrust washer 58 towards each other until rear end 80 of compressor impeller 16 abuts on an inside wall of cap portion 136 adjacent third distal end 140 and until thrust washer 58 is firmly seated between second cap end 134 of impeller cap 54 and shoulder 184 of trailing shaft portion 164. Continued rotation of drive portion 196 may allow stud 60 to be stretched further, helping to develop a prescribed tension pre-load in stud 60. Further, when first pitch of threads 120 is smaller than second pitch of threads 180, stud 60 may advance in threads 120 by a smaller axial distance compared to an axial distance by which stud 60 may advance in threads 180. As a result, stud 60 may be extended and subjected to tensile loading.

Referring to FIGS. 4 and 5, during assembly of turbocharger 10 using compressor impeller assembly 210, insert 52 may be attached to compressor impeller 212 by screwing first insert portion 112 into impeller bore 232. Impeller cap 214 may be attached to compressor impeller 212 so that cap portion 238 of impeller cap 214 may engage with outer surface 230 of hub extension 220, while simultaneously allowing outer surface 124 of insert 52 to engage via anti-rotational feature 248 with second cap bore 244. Thrust washer 58 may be attached to cap pilot 252 via an interference fit or a clearance fit between washer bore 186 and outer surface 256 of cap pilot 252. First shaft portion 266 may be inserted so that first shaft portion 266 passes through third cap bore 250 and so that threads on first shaft portion 266 engage with threads 120 in first insert bore 118. Suitable tooling may be used to turn shaft 216 from adjacent second shaft end 264. As shaft 216 is turned, compressor impeller 212 and thrust washer 58 may be drawn towards each other until rear end 226 of compressor impeller 212 abuts on an inner wall of first cap bore 240 adjacent second distal end 242 and until thrust washer 58 is firmly seated between shoulder 254 of impeller cap 214 and shoulder 276 of second shaft portion 268. Continued turning of shaft 216 may allow first shaft portion 266 to be stretched further, helping to develop a prescribed tension pre-load in first shaft portion 266.

It will be apparent to those skilled in the art that various modifications and variations can be made to the disclosed compressor impeller assembly. Other embodiments will be apparent to those skilled in the art from consideration of the specification and practice of the disclosed compressor impeller assembly. It is intended that the specification and examples be considered as exemplary only, with a true scope being indicated by the following claims and their equivalents.

What is claimed is:

1. A compressor impeller assembly, comprising:
    a compressor impeller having an impeller bore;
    an insert screwed into the impeller bore, the insert having a threaded insert bore;
    a shaft having a threaded shaft bore;
    a stud, including:
        a first threaded portion engaged with the threaded insert bore; and
        a second threaded portion engaged with the threaded shaft bore, wherein the impeller bore is a first impeller bore having a first diameter and the compressor impeller includes:
        a front end and a rear end opposite the front end;
        a hub extension extending from the rear end to a first distal end between the front end and the rear end, the first impeller bore being disposed in the hub extension;
        a second impeller bore having a second diameter, the second impeller bore extending from the front end to a second distal end disposed between the front end and the first distal end; and
        a third impeller bore having a third diameter smaller than the first diameter and the second diameter, the third impeller bore extending from the first distal end to the second distal end.

2. The compressor impeller assembly of claim 1, wherein the stud extends from a first stud end to a second stud end, the first threaded portion is disposed between the first stud end and the second stud end, and
    the second threaded portion is disposed adjacent the second stud end.

3. The compressor impeller assembly of claim 2, wherein the threaded insert bore has first threads having a first pitch;
    the threaded shaft bore has second threads having a second pitch different from the first pitch.

4. The compressor impeller assembly of claim 3, wherein the second pitch is coarser than the first pitch.

5. The compressor impeller assembly of claim 1, wherein the second impeller bore further includes:
    a first annular recess disposed at a first axial distance from the front end;
    a second annular recess disposed at a second axial distance from the front end, the second axial distance being larger than the first axial distance;
    a first seal member is disposed in the first annular recess; and
    a second seal member is disposed in the second annular recess.

6. The compressor impeller assembly of claim 5, wherein the first annular recess has a first radius and the second annular recess has a second radius smaller than the first radius.

7. The compressor impeller assembly of claim 1, wherein the hub extension includes a first outer surface,
    the insert includes:
    a first insert portion disposed within the first impeller bore; and a second insert portion disposed outside the first impeller bore, the second insert portion having a second outer surface, and the compressor impeller assembly further includes an impeller cap, including:
a first cap bore that engages with the first outer surface; and
a second cap bore that engages with the second outer surface.

8. The compressor impeller assembly of claim 7, wherein the second cap bore and the second outer surface include an anti-rotational feature.

9. The compressor impeller assembly of claim 8, wherein the anti-rotational feature includes a three-lobed polygon.

10. A compressor impeller assembly, comprising:
a compressor impeller including:
a front end and a rear end opposite the front end;
a nose disposed adjacent the front end;
a hub extension disposed adjacent the rear end, the hub extension having an impeller bore and a first outer surface; and
blades disposed between the nose and the hub extension;
an insert screwed into the impeller bore, wherein the insert includes:
a first insert portion disposed within the impeller bore, the first insert portion having a threaded insert bore; and
a second insert portion disposed outside the impeller bore, the second insert portion having a second outer surface
a shaft extending from a first shaft end to a second shaft end, the shaft being attached to the insert adjacent the first shaft end; and
an impeller cap, having:
a first cap bore that engages with the first outer surface, the first cap bore and the first outer surface include an anti-rotational feature; and
a second cap bore that engages with the second outer surface.

11. The compressor impeller assembly of claim 10, wherein
the impeller cap extends from a first cap end to a second cap end,
the first cap bore is disposed adjacent the first cap end, and the shaft includes:
a first shaft portion having a threaded region that engages with the threaded insert bore; and
a second shaft portion having a first shoulder disposed adjacent the second cap end.

12. The compressor impeller assembly of claim 11, wherein
the impeller cap further includes a cap pilot extending from the second cap end to a second shoulder disposed between the first cap end and the second cap end, and
the compressor impeller assembly further includes a thrust washer disposed between the first shoulder and the second shoulder.

13. The compressor impeller assembly of claim 12, wherein the thrust washer includes a washer bore that engages with a third outer surface of the cap pilot, the washer bore and the third outer surface having an anti-rotational feature.

14. A turbocharger, comprising:
a turbine housing;
a turbine wheel disposed within the turbine housing and configured to be rotated by exhaust received from an engine;
a compressor housing;
a compressor impeller disposed within the compressor housing, the compressor impeller including a hub extension having an impeller bore and a first outer surface, wherein the impeller bore is a first impeller bore having a first diameter, and the compressor impeller includes:
a front end and a rear end opposite the front end, the hub extension extending from the rear end to a first distal end disposed between the front end and the rear end;
a second impeller bore having a second diameter, the second impeller bore extending from the front end to a second distal end disposed between the front end and the first distal end; and
a third impeller bore having a third diameter smaller than the first diameter and the second diameter, the third impeller bore extending from the first distal end to the second distal end;
an insert including:
a first insert portion disposed within the impeller bore, the first insert portion having a threaded insert bore having a first pitch; and
a second insert portion disposed outside the impeller bore, the second insert portion having a second outer surface;
an impeller cap extending from a first cap end to a second cap end, the impeller cap including:
a cap portion disposed adjacent the first cap end and engages with the first outer surface; and
a cap bore disposed between the first cap end and the second cap end, the cap bore engages with the second outer surface;
a thrust washer disposed adjacent the second cap end;
a shaft extending from a first shaft end to a second shaft end, the shaft being attached to the turbine wheel adjacent the second shaft end, the shaft including a threaded shaft bore having a second pitch different from the first pitch, the threaded shaft bore being disposed between the first shaft end and the second shaft end; and
a stud, including:
a first threaded portion engaged with the threaded insert bore; and
a second threaded portion engaged with the threaded shaft bore.

15. The turbocharger of claim 14, wherein the second impeller bore further includes:
a first annular recess having a first radius, the first annular recess being disposed at a first axial distance from the front end;
a second annular recess having a second radius smaller than the first radius, the second annular recess being disposed at a second axial distance from the front end, the second axial distance being larger than the first axial distance;
a first seal member is disposed in the first annular recess; and
a second seal member is disposed in the second annular recess.

* * * * *